United States Patent
Liu et al.

(10) Patent No.: US 12,021,662 B2
(45) Date of Patent: Jun. 25, 2024

(54) APERIODIC SOUNDING REFERENCE SIGNAL (A-SRS) CONFIGURATION

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/584,506

(22) Filed: Sep. 26, 2019

(65) Prior Publication Data

US 2020/0106646 A1  Apr. 2, 2020

Related U.S. Application Data

(60) Provisional application No. 62/739,054, filed on Sep. 28, 2018.

(51) Int. Cl.
| | |
|---|---|
| *H04L 25/02* | (2006.01) |
| *H04L 1/00* | (2006.01) |
| *H04L 5/00* | (2006.01) |
| *H04W 72/04* | (2023.01) |
| *H04W 72/0446* | (2023.01) |
| *H04W 72/20* | (2023.01) |

(52) U.S. Cl.
CPC ........ *H04L 25/0226* (2013.01); *H04L 1/0013* (2013.01); *H04L 5/0051* (2013.01); *H04W 72/0446* (2013.01); *H04W 72/20* (2023.01)

(58) Field of Classification Search
CPC . H04L 25/0226; H04L 5/0051; H04L 1/0013; H04W 72/0406; H04W 72/0446
See application file for complete search history.

(56) References Cited

U.S. PATENT DOCUMENTS

| | | | |
|---|---|---|---|
| 9,603,169 B2* | 3/2017 | Kim | H04L 5/0048 |
| 9,723,603 B2* | 8/2017 | Takeda | H04L 5/0091 |
| 9,788,278 B2* | 10/2017 | Nam | H04L 5/0048 |
| 10,057,893 B2 | 8/2018 | Chen et al. | |
| 10,270,570 B2* | 4/2019 | Liu | H04W 72/042 |
| 2010/0103902 A1* | 4/2010 | Kim | H04L 5/0048 370/330 |
| 2012/0069812 A1* | 3/2012 | Noh | H04L 5/0091 370/329 |
| 2012/0076037 A1* | 3/2012 | Noh | H04L 5/0007 370/252 |

(Continued)

FOREIGN PATENT DOCUMENTS

| | | |
|---|---|---|
| WO | WO-2013169966 A1 | 11/2013 |
| WO | WO-2016179834 A1 | 11/2016 |

(Continued)

OTHER PUBLICATIONS

"CATT, Details of rate matching for PDSCH and PUSCH, Oct. 9, 2017, 3GPP TSG RAN WGl Meeting 90bis, pp. 1-6" (Year: 2017).*

(Continued)

*Primary Examiner* — Rasheed Gidado
(74) *Attorney, Agent, or Firm* — QUALCOMM INCORPORATED

(57) ABSTRACT

Certain aspects of the present disclosure provide techniques for aperiodic sounding reference signal (A-SRS) resource configuration and processing enhancements.

6 Claims, 21 Drawing Sheets

(56) References Cited

U.S. PATENT DOCUMENTS

| | | | |
|---|---|---|---|
| 2012/0243505 A1* | 9/2012 | Lin | H04L 5/0051 |
| | | | 370/331 |
| 2013/0121280 A1* | 5/2013 | Ouchi | H04L 5/0048 |
| | | | 370/329 |
| 2013/0170466 A1* | 7/2013 | Nishio | H04W 72/042 |
| | | | 370/329 |
| 2013/0242911 A1* | 9/2013 | Heo | H04L 5/0048 |
| | | | 370/329 |
| 2014/0254492 A1* | 9/2014 | Noh | H04W 74/0833 |
| | | | 370/328 |
| 2015/0003351 A1* | 1/2015 | Park | H04L 5/0044 |
| | | | 370/329 |
| 2015/0085787 A1* | 3/2015 | Ouchi | H04L 5/0094 |
| | | | 370/329 |
| 2017/0086189 A1* | 3/2017 | Ouchi | H04W 52/346 |
| 2017/0288833 A1* | 10/2017 | Islam | H04W 52/36 |
| 2018/0006788 A1* | 1/2018 | Lee | H04L 5/0051 |
| 2018/0183552 A1* | 6/2018 | Hosseini | H04L 5/0082 |
| 2019/0029052 A1* | 1/2019 | Yang | H04L 1/1812 |
| 2019/0174466 A1* | 6/2019 | Zhang | H04L 5/005 |
| 2019/0215110 A1* | 7/2019 | Yang | H04W 76/27 |
| 2019/0356447 A1* | 11/2019 | Iwai | H04W 52/22 |
| 2019/0372734 A1* | 12/2019 | Choi | H04L 5/0048 |
| 2020/0028642 A1* | 1/2020 | He | H04W 72/12 |
| 2020/0036556 A1* | 1/2020 | Wei | H04L 25/0224 |
| 2020/0336264 A1* | 10/2020 | Faxer | H04B 7/0617 |
| 2021/0250149 A1* | 8/2021 | Muruganathan | H04L 5/0078 |

FOREIGN PATENT DOCUMENTS

| | | |
|---|---|---|
| WO | 2017131476 A1 | 8/2017 |
| WO | WO-2017135713 A1 | 8/2017 |
| WO | WO-2017167304 A1 | 10/2017 |
| WO | WO-2018119851 A1 | 7/2018 |
| WO | WO-2018151554 A1 | 8/2018 |

OTHER PUBLICATIONS

"Spreadtrum Communications, Discussion on rate matching for data channel, Aug. 21, 2017, 3GPP TSG RAN WGI Meeting #90, pp. 1-3" (Year: 2017).*

Huawei et al., "Rate Matching for Data Channels", 3GPP Draft; R1-1717298, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Oct. 9, 2017-Oct. 13, 2017 Oct. 8, 2017, XP051340488, Retrieved from the Internet: URL:http://www.3gpp.org/ftp/Meetings_3GPP_SYNC/RAN1/Docs/ [retrieved on Oct. 8, 2017], section 2.3, 6 pages.

International Search Report and Written Opinion—PCT/US2019/053394—ISA/EPO—dated Dec. 20, 2019.

Taiwan Search Report—TW108135136—TIPO—dated Sep. 27, 2022.

* cited by examiner

| subframe index | 0 | 1 | 2 | 3 | 4 | 5 | 6 | 7 | 8 | Notes |
|---|---|---|---|---|---|---|---|---|---|---|
| cell-specific SRS subfames | x | | x | | x | | x | | x | semi-static |
| legacy UE specific A SRS subfames | x | | | | x | | | | x | semi-static |
| Opt1 | x | | | | x | | | | x | semi-static |
| Opt2 | x | | | | x | | | | | DCI(t1) |
| | | | | | x | | | | x | DCI(t2) |
| | | | | | | | x | | x | DCI(t3) |
| Opt3 | x | | | | x | | | | | DCI(t1) |
| | x | | x | | x | | | | x | DCI(t2) |
| | | | | | x | | x | | x | DCI(t3) |

Non-UE-specific A SRS subframe

1500

Example Use of UL grant or DL grant DCI for new SRS set trigger

| Value of SRS request field | Description |
|---|---|
| 0 | RM and transmit SRS according to SRS TX/RM set config1 |
| 1 | RM and transmit SRS according to SRS TX/RM set config2 |
| 2 | RM and transmit SRS according to SRS TX/RM set config3 |
| ... | ... |

| Value of SRS request field | Description |
|---|---|
| '00' | 0 symbol for SRS TX<br>1 last symbol for RM |
| '01' | 1 last symbol for SRS TX for AP0/1<br>1 last symbol for RM |
| '10' | 4 new symbols for SRS TX for AP0/1<br>7 new symbols for RM |
| '11' | 0 symbol for SRS tx<br>7 new symbols for RM |

Configuration of SRS parameter sets

|  | For UE capable of SRS 1T2R | For UE capable of SRS 1T4R | For UE capable of SRS 2T4R |
| --- | --- | --- | --- |
| SRS tx/RM set 1 | SRS no AS (fixed on AP0) | SRS no AS (fixed on AP0) | SRS no AS (fixed on AP0+AP1) |
| SRS tx/RM set 2 | SRS AS 1T2R | SRS AS 1T4R | SRS AS 2T4R |

FIG. 21

APERIODIC SOUNDING REFERENCE SIGNAL (A-SRS) CONFIGURATION

CROSS-REFERENCE TO RELATED APPLICATIONS

This Patent Application claims priority to U.S. Provisional Patent Application No. 62/739,054 filed Sep. 28, 2018, which is assigned to the assignee hereof, is considered part of, and is incorporated by reference in this Patent Application.

FIELD OF THE DISCLOSURE

Aspects of the present disclosure relate to wireless communications, and more particularly, to techniques for aperiodic sounding reference signal (A-SRS) resource configuration and processing enhancements.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving, from the network, signaling indicating an aperiodic sounding reference signal (A-SRS) configuration that indicates, for a set of one or more uplink subframes, a first number and location of zero or more symbols allocated for SRS transmissions and a second number and location of zero or more symbols for which rate matching is to be performed and sending an uplink transmission, within at least one of the set of uplink subframes, with SRS and rate matching performed according to the A-SRS configuration.

Certain aspects provide a method for wireless communications by a network entity. The method generally includes transmitting, to a user equipment (UE), signaling indicating an aperiodic sounding reference signal (A-SRS) configuration that indicates, for a set of one or more uplink subframes, a first number and location of zero or more symbols allocated for SRS transmissions and a second number and location of zero or more symbols for which rate matching is to be performed and processing an uplink transmission from the UE, within at least one of the set of uplink subframes, in accordance with the A-SRS configuration.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 15-19 illustrate examples of triggering A-SRS and rate matching, in accordance with aspects of the present disclosure.

FIG. 21 illustrates example antenna switching for A-SRS, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
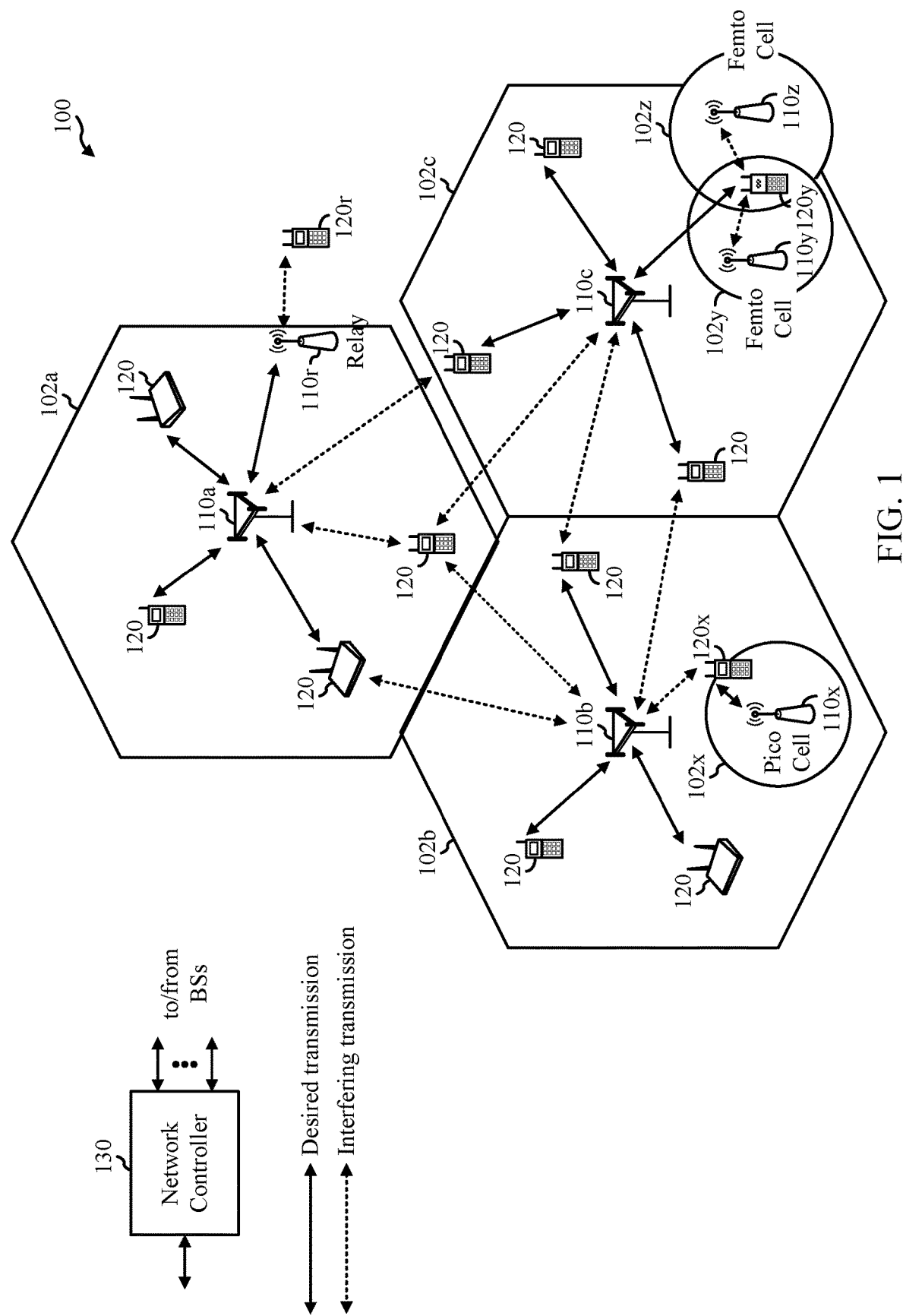
FIG. 1 is a block diagram conceptually illustrating an example telecommunications system, in accordance with certain aspects of the present disclosure.

Aspects of the present disclosure provide apparatus, methods, processing systems, and computer readable mediums for aperiodic sounding reference signal (A-SRS) resource configuration and transmission enhancements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 includes one or more BS 110 configured to perform operations 900 of FIG. 9 to signal an aperiodic sounding reference signal (A-SRS) configuration to a UE 120. UE 120, in turn, may perform operations 1000 of FIG. 10 to transmit A-SRS in accordance with the configuration.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
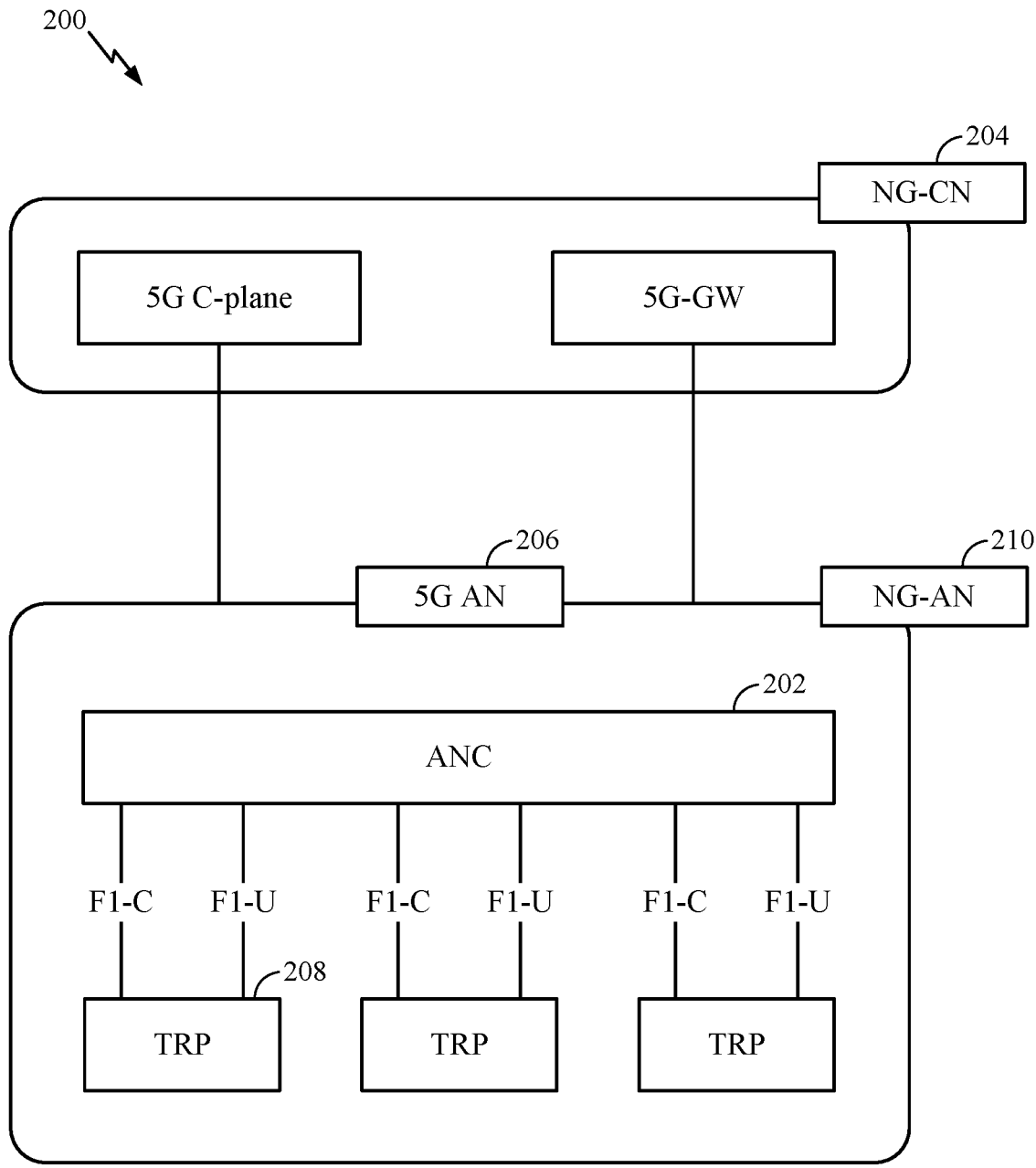
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
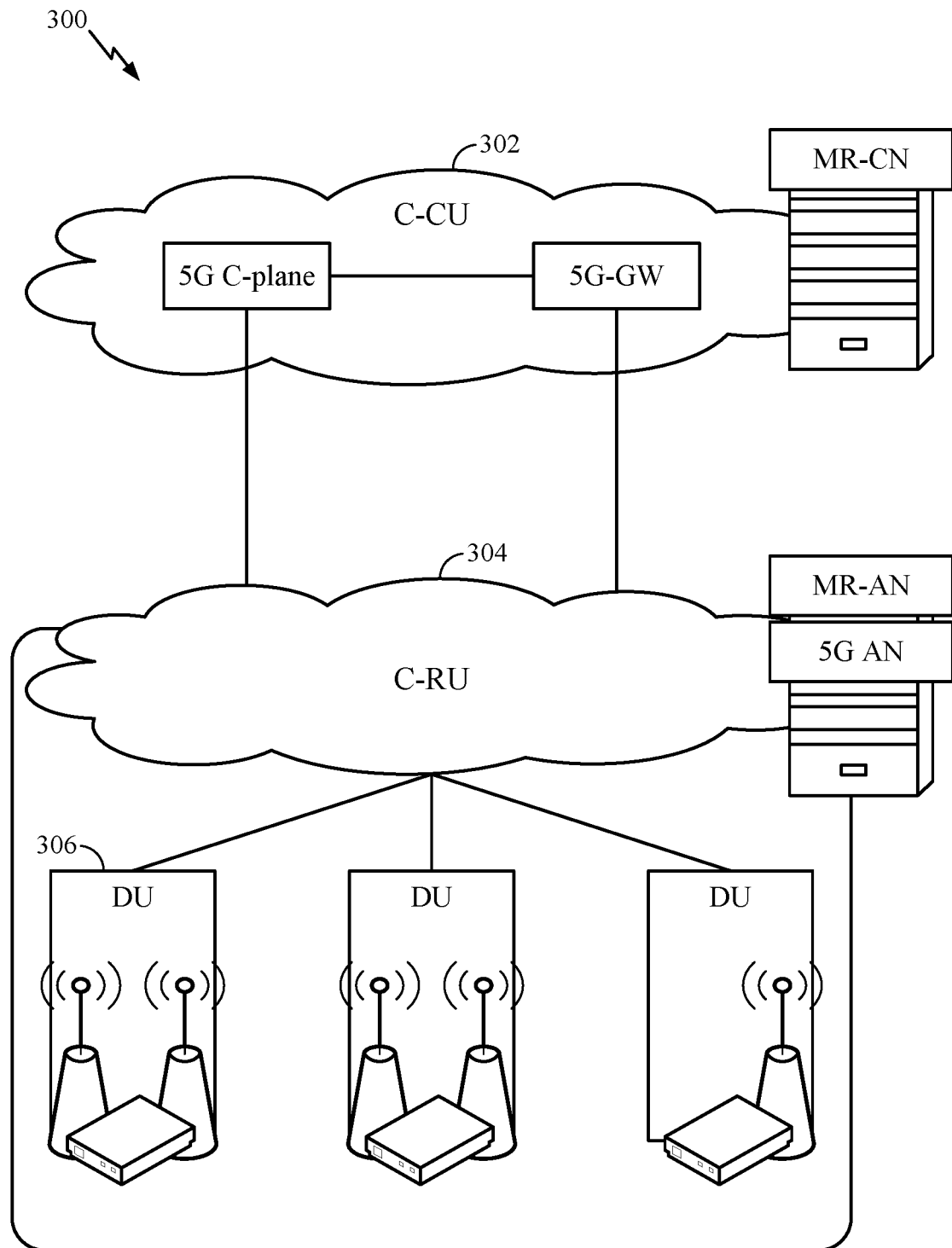
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
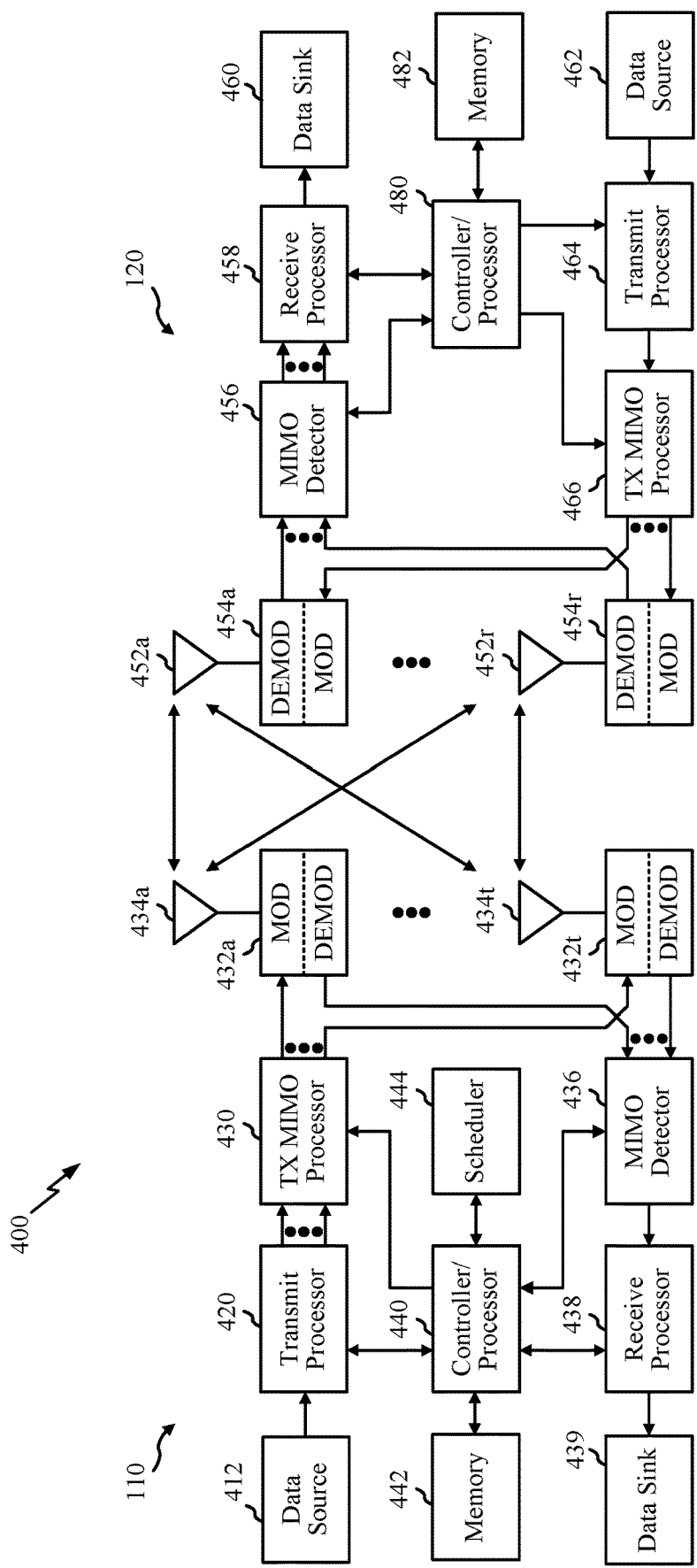
FIG. 4 is a block diagram conceptually illustrating a design of an example base station (B S) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 1000 of FIG. 10. Similarly, antennas 434, processors 420, 430, 438, and/or controller/processor 440 of the BS 110 may be used to perform operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
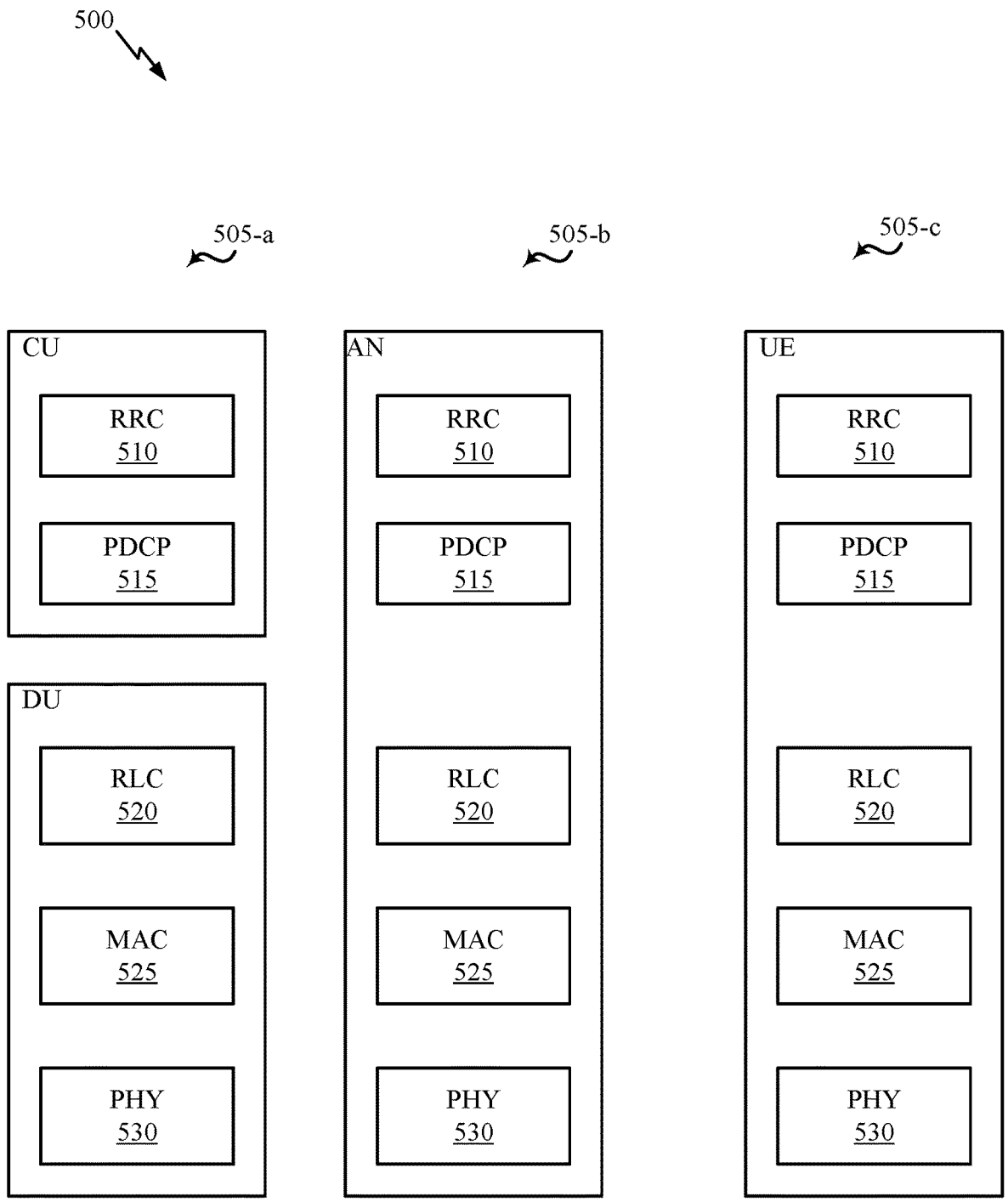
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
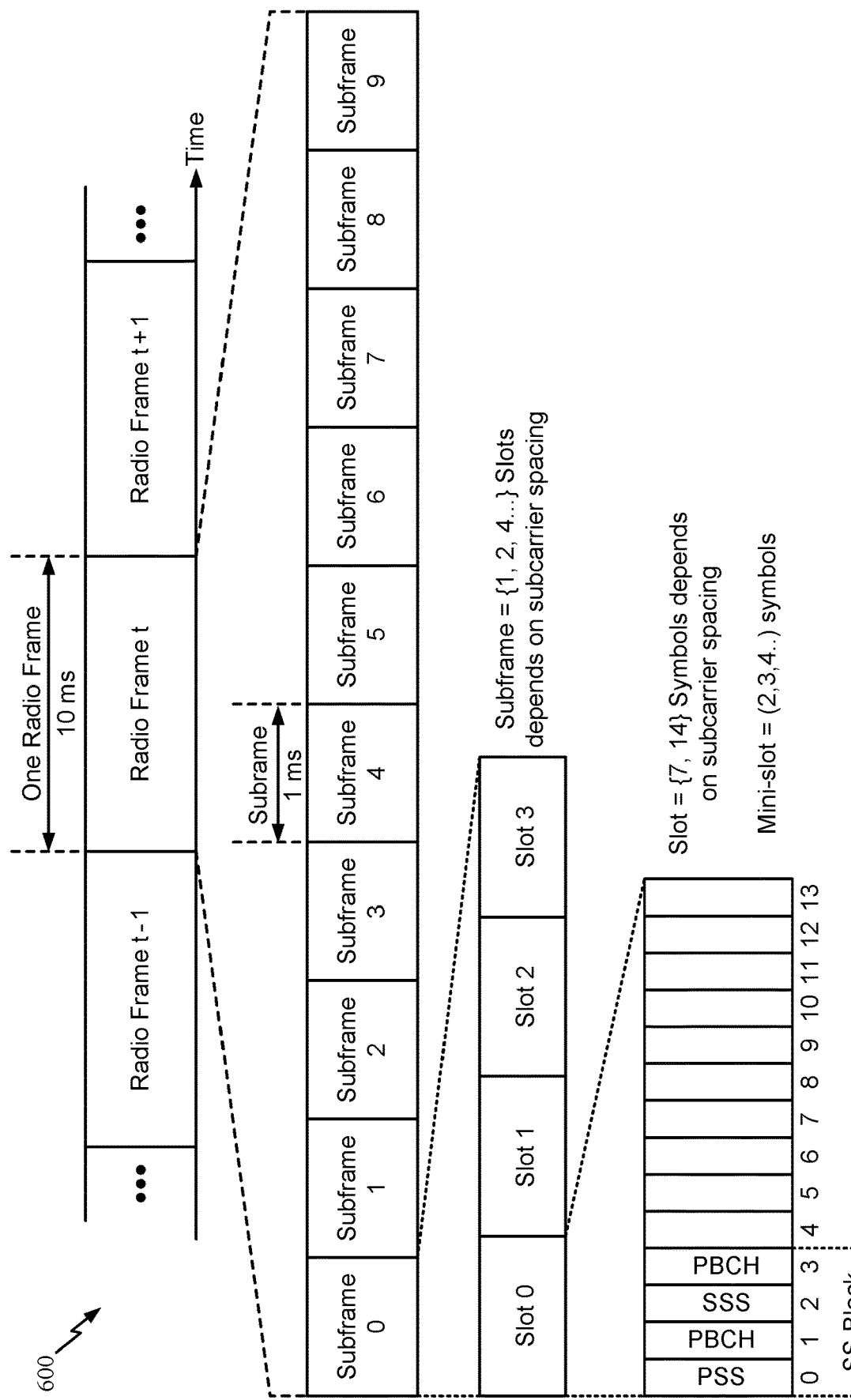
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example A-SRS Transmission and Rate Matching

In wireless communication systems, such as the wireless communication system described above, user equipments (UEs) may transmit sounding reference signals (SRSs) so that the network/base station (e.g., eNBs, gNB, etc.) can measure uplink channel quality. Conventionally, one SRS is transmitted by a UE in a last symbol of a normal uplink subframe. However, more recently, additional symbols have been introduced for transmitting SRSs in a normal uplink (UL) subframe, which may be identified based on a virtual cell ID associated with the UE that transmitted the (additional) SRSs. In this context, a "normal subframe" is contrasted with a "special subframe" such as those defined and placed between "normal DL subframes" and "normal UL subframes" that allow a UE to switch between receive and transmit processing.

In some cases, SRS capacity and coverage enhancements have been supported by introducing more than one symbol for SRS on UL normal subframe and utilizing a virtual cell ID for SRS. This may involve introducing more than one symbol for SRS for one UE or for multiple UEs on a UL normal subframe. As a baseline, a minimum SRS resource allocation granularity for a cell may be one slot (e.g., one of two time slots of a subframe), when more than one symbol in a normal subframe is allocated for SRS for the cell. As noted above, a virtual cell ID may be introduced for SRS, allowing different SRS transmissions to be distinguished.

Objectives of introducing additional SRS symbols may include increasing link budget for power-limited UEs (e.g., to give more opportunities to UEs to transmit SRS) and/or increasing capacity in general (e.g., to allow more UEs to transmit SRS, or more antennas from same UE). One relatively straightforward way of extending link budget is by the use of more SRS symbols per subframe, but this presents various challenges. These challenges may include one or more of the following: having less symbols in a subframe can be used for other UL channels, how to perform rate matching when multiple SRS symbols collide with PUSCH, impact on channel estimation if multiple SRS symbols collide with UL DMRS and what dropping rules to apply if multiple SRS symbols collide with PUCCH.

Aspects of the present disclosure provide techniques for flexible A-SRS configuration of multiple SRS transmissions in the same subframe and flexible rules for handling collisions between SRS and other UL channels.

Figure 7:
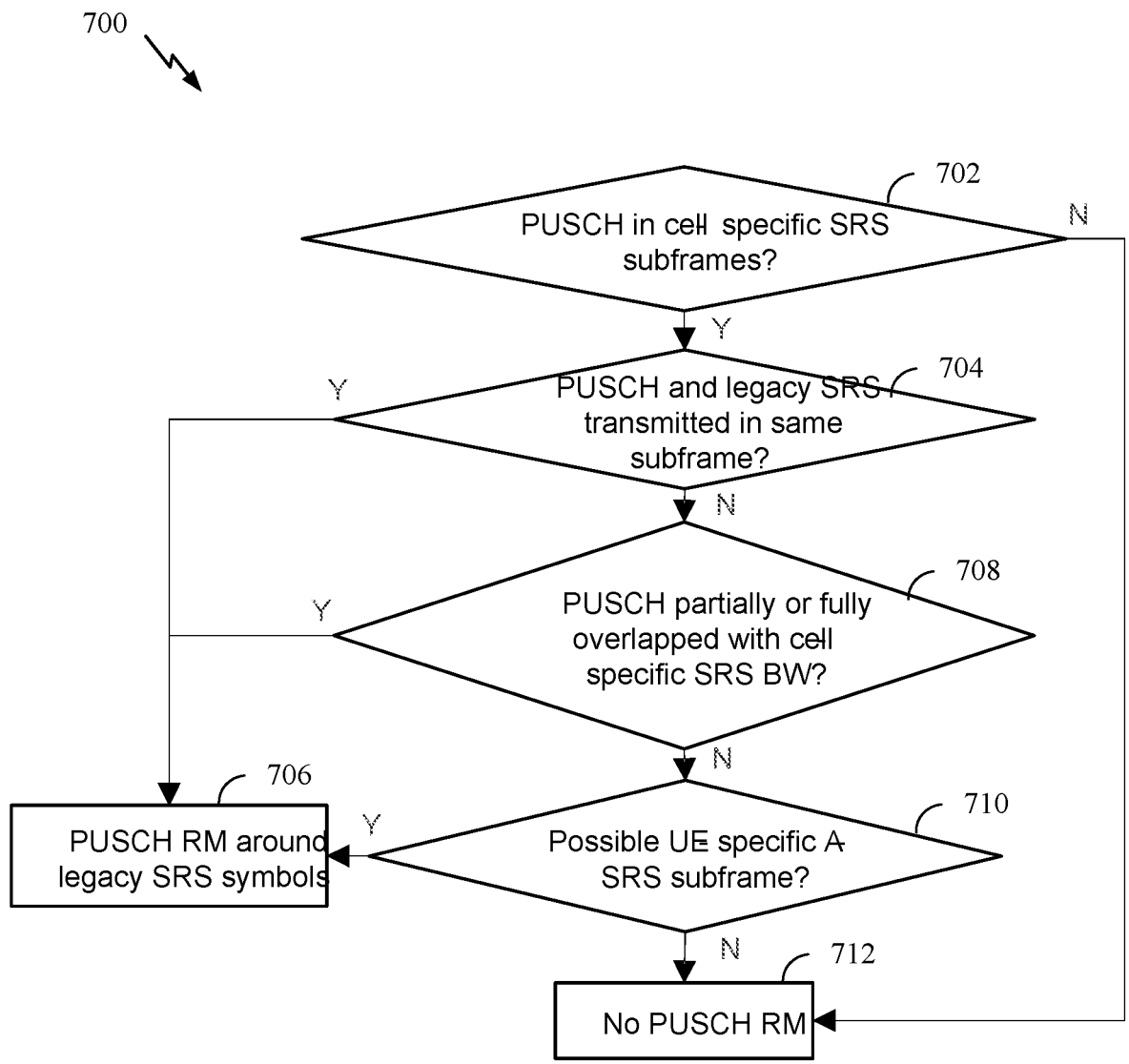
FIG. 7 illustrates an example flow diagram for rate matching an uplink transmission around SRS.

FIG. 7 illustrates example operations 700 for rate matching an uplink transmission around SRS. At 702, a determination is made if PUSCH is in cell-specific SRS subframes, referring to (possible subframes for periodic SRS (P-SRS) or aperiodic SRS (A-SRS). If not, no rate matching (RM) is performed (per 712). If PUSCH is in cell-specific SRS subframes, if PUSCH and legacy SRS are to be transmitted in the same subframe (as determined at 704), PUSCH is rate matched (RM'd) around legacy SRS symbols (at 706). If PUSCH overlaps (partially or fully) with cell-specific SRS BW, as determined at 708, PUSCH is rate matched (RM'd) around legacy SRS symbols (at 706). As illustrated, PUSCH is rate matched around also in the case the subframe is a UE-specific A-SRS subframe (as determined at 710) no matter whether the PUSCH is overlapped with SRS BW or not.

Figure 8:
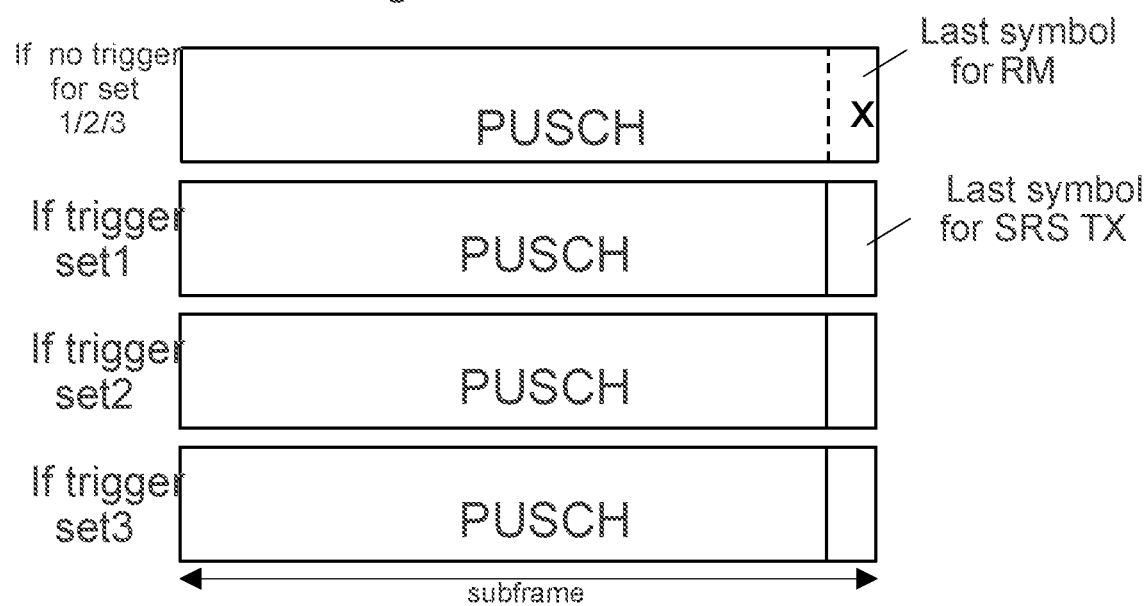
FIG. 8 illustrates example DCI for triggering A-SRS transmission.

As illustrated in FIG. 8, in UE-specific A-SRS subframe, a last symbol of normal uplink subframe is always counted for RM purposes. As also illustrated in FIG. 8, a particular A-SRS set can be triggered by using DCI bits in a DL grant or UL grant. In other words, a rate matching configuration (RM config) may indicate that the last symbol in a normal subframe is rate matched around, while an SRS transmission configuration (SRS TX config) may specify that the last symbol in a normal uplink subframe is allocated for SRS transmission, and may specify other configuration information (e.g., #ports, periodicity, etc.).

Aperiodic SRS for additional SRS symbols (in addition to the last symbol) in normal subframes generally represents a trade-off between SRS enhancement and DL/UL throughput impact. The additional SRS symbols may help increase link budget for power-limited UEs (i.e., give such a UE more opportunities to transmit SRS) and may increase capacity in general (i.e., allow more UEs to transmit SRS, or more antennas from same UE).

However, various issues need to be considered to optimize performance and avoid wasting resources, such as how to trigger A-SRS (e.g., via DL/UL grants) and when to perform rate matching for PUSCH/PUCCH. Always rate matching PUSCH around A-SRS symbols may amount to a waste of resources (that could be used for data/UCI). How to trigger aperiodic SRS for antenna switching is another issue to be considered (legacy SRS antenna switching is only periodic for TDD not for A-SRS).

Aspects of the present disclosure provide techniques for A-SRS transmission and rate matching configurations that may help address these issues. Some options presented herein may avoid always rate matching around A-SRS, which may result in a more efficient use of resources. For example, if additional SRS (on additional symbols) is configured, but not triggered, PUSCH rate matching may not be performed, allowing for uplink data and/or UCI to be transmitted rather than wasting those resources.

Figure 9:
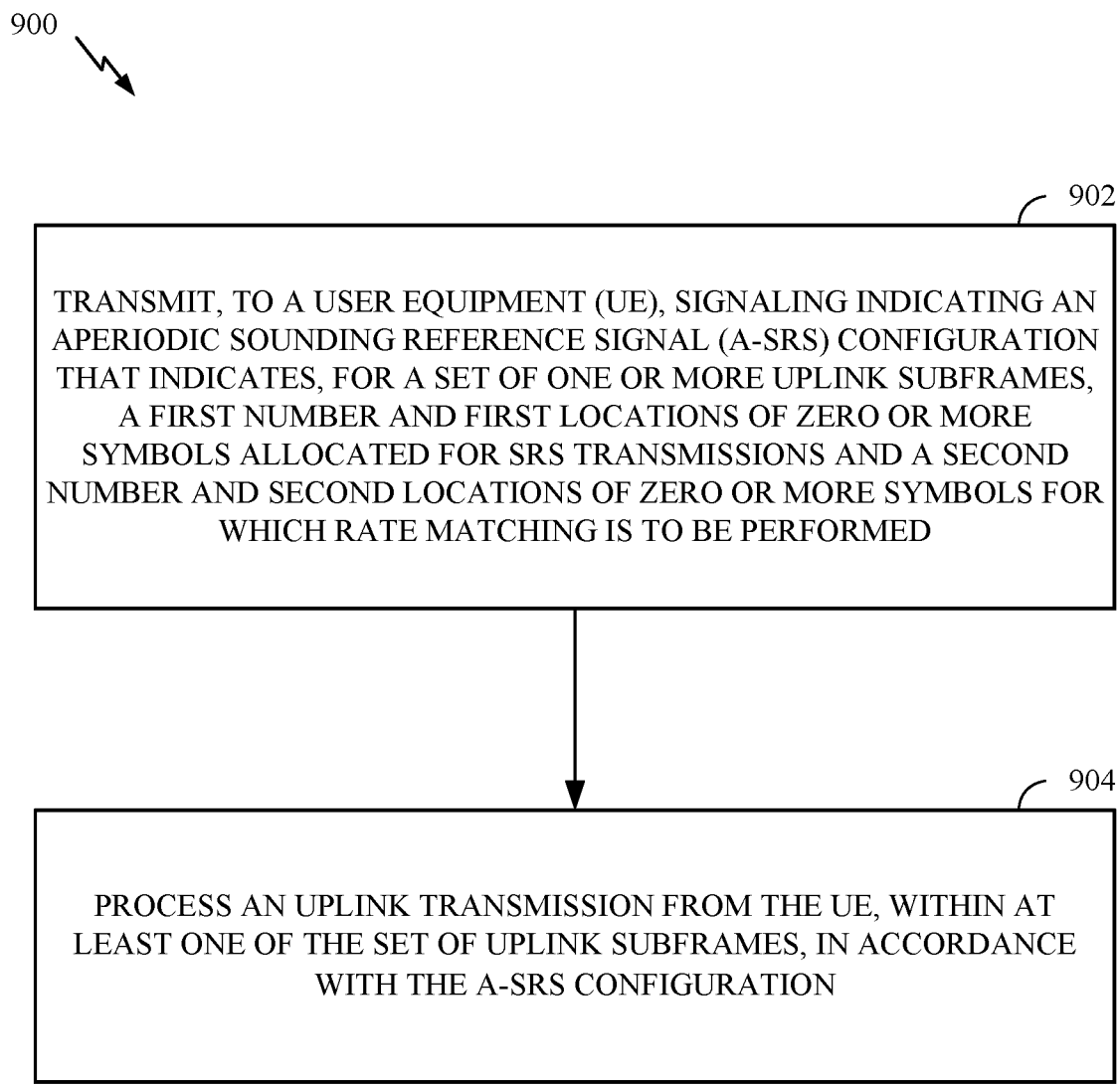
FIG. 9 illustrates example operations for wireless communications by a network entity, in accordance with certain aspects of the present disclosure.

FIG. 9 illustrates example operations 900 for wireless communications by a network entity. For example, operations 900 may be performed by a gNB to configure a UE for A-SRS transmission and rate matching in accordance with aspects of the present disclosure.

Operations 900 begin, at 902, by transmitting, to a user equipment (UE), signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed. At 904, the network entity processes an uplink transmission from the UE, within at least one of the set of uplink subframes, in accordance with the A-SRS configuration.

Figure 10:
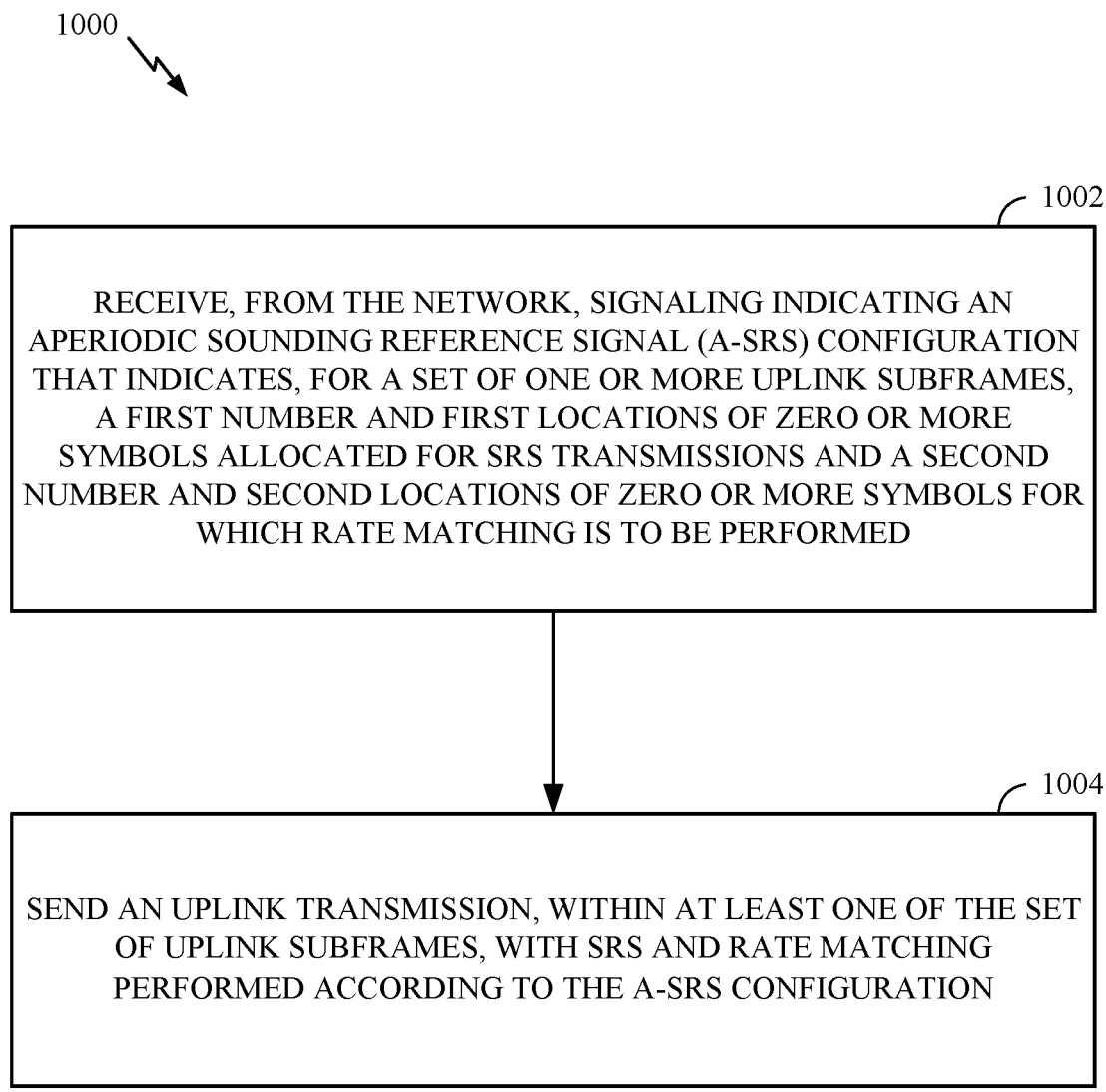
FIG. 10 illustrates example operations for wireless communications by a user equipment, in accordance with certain aspects of the present disclosure.

FIG. 10 illustrates example operations 1000 for wireless communications by a network entity. For example, operations 1000 may be performed by a UE to be configured and perform A-SRS, for example, by a gNB performing operations 900 described above.

Operations 1000 begin, at 1002, by receiving, from the network, signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed. At 1004, the UE sends an uplink transmission, within at least one of the set of uplink subframes, with SRS and rate matching performed according to the A-SRS configuration.

Figure 11:
FIG. 11 summarizes various options for A-SRS and rate matching configurations, in accordance with certain aspects of the present disclosure.

FIG. 11 summarizes example options (Opt 1, Opt 2, and Opt 3) for configuring A-SRS transmission (TX) and PUSCH or PUCCH rate matching (RM) in a same serving cell, in accordance with aspects of the present disclosure.

According to a first option (Opt 1), conventional DCI may be used to trigger A-SRS, while a subset of UE-specific A-SRS subframes may be semi-statically defined for SRS transmission and/or RM using the configuration of legacy SRS symbols and additional SRS symbols in normal subframes. As used herein, legacy symbols for SRS generally refer to a last symbol in a normal subframe, while additional symbols refer to SRS symbols other than the last symbol.

In this option, legacy UE-specific A-SRS subframes are possible subframes for SRS TX and/or RM only on last symbol in normal subframes. In a UE-specific A-SRS subframe, the last symbol per normal subframes may always be counted for RM. The legacy UE-specific A-SRS subframes may also be the possible subframes for SRS Tx in the additional symbols, as well. The legacy UE-specific A-SRS subframes may be also used for RM around the additional SRS symbols or the possible symbols configured for the additional SRS. For example, the PUSCH RM may be needed around the additional SRS symbols or the possible symbols configured for the additional SRS, even if the additional SRS is not triggered to be transmitted. Another example is the RM may be needed in the UE-specific A-SRS subframe only if the PUSCH is overlapped with SRS BW configured for the additional SRS symbols. Alternatively, the subset of legacy UE-specific A-SRS subframes may be the subframes for RM around the additional SRS symbols. The number and location of the symbols for SRS transmission and the number of symbols for RM, however, may be configured differently (e.g., by unicast RRC configuration signaling).

According to a second option (Opt 2), a new DCI format may be used to dynamically indicate A-SRS TX and/or RM using legacy and additional symbols in UE-specific A-SRS subframes. This new DCI may have a same size SRS request field as conventional (legacy) DCI formats. In this option, a UE may be preconfigured (or RRC-configured) with multiple sets of A-SRS TX and/or RM configurations. In this option, a new DCI state (code point value) triggers one of the sets of A-SRS TX and/or RM configurations. Different configurations may have the same or different symbol(s) for A-SRS TX and RM, as will be described in greater detail below. With this second option, in UE-specific A-SRS subframes, the last symbol (per normal subframes) may be counted for RM, which is compatible with the behavior of a legacy UE.

According to a third option (Opt 3), a new DCI may dynamically indicate A-SRS TX and/or RM using symbols including legacy and additional symbols in cell-specific SRS subframes. The new DCI may trigger (via a code point) only aperiodic legacy SRS symbols, may trigger only additional SRS symbols, or may trigger both aperiodic legacy and additional symbols in the same subframe. In some cases, the association between a DCI code point and which SRS is triggered may be configured by RRC signalling (which may include a separate code point for the case of no SRS triggering).

In some cases, the new DCI may trigger one of the (RRC-configured or predefined several sets of A-SRS TX and/or RM), which may same or different symbols for A-SRS TX and RM. In this option, however, whether the last symbol of normal subframes is counted for RM or not depends on the triggered set.

Figure 12:
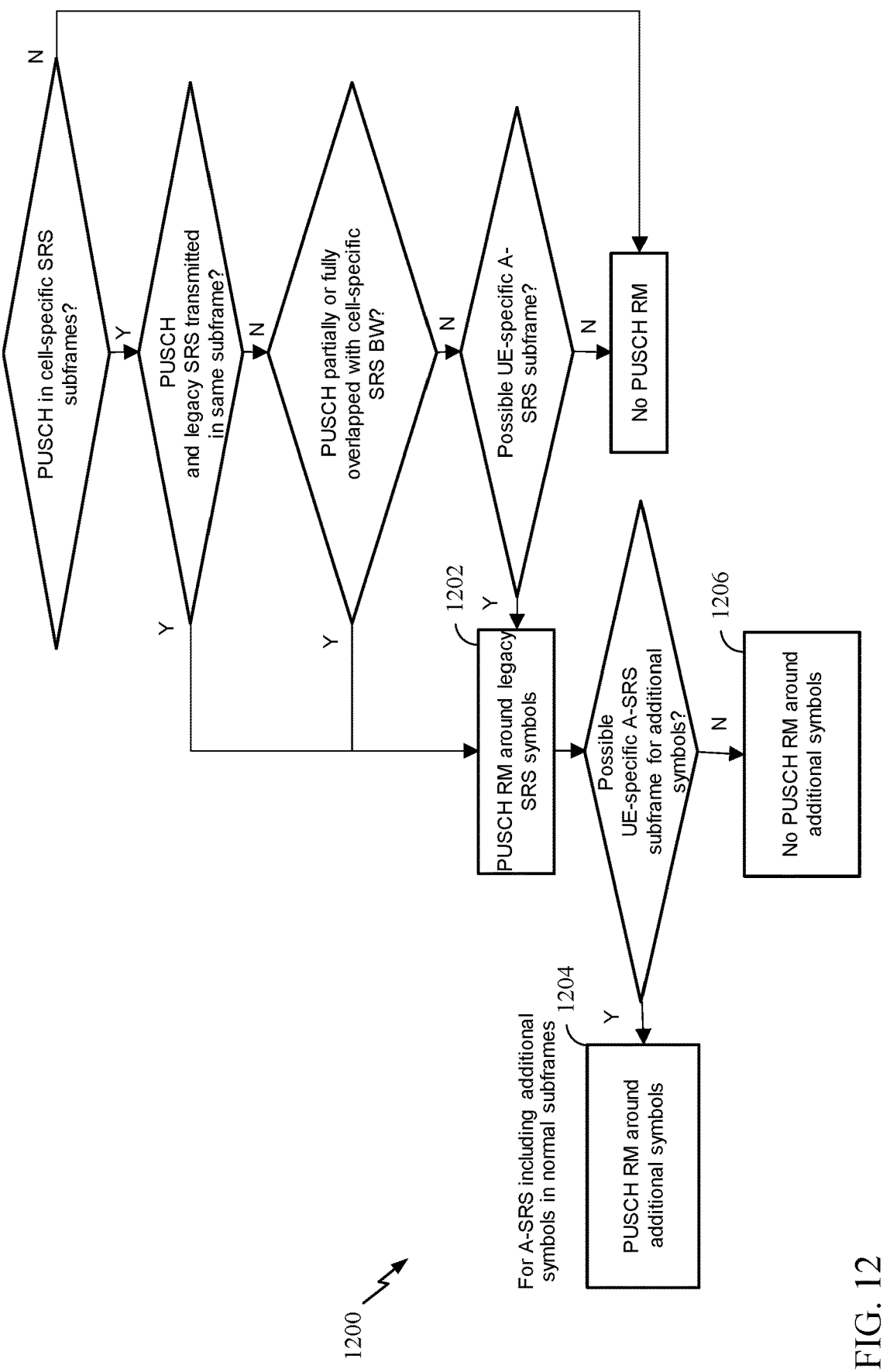
FIG. 12-14 illustrate example flow diagrams for A-SRS transmission and rate matching, in accordance with aspects of the present disclosure.

FIG. 12 illustrates example operations 1200 for A-SRS transmission and rate matching according to the first option. As illustrated, when compared to FIG. 7, operations 1200 are performed to account for A-SRS including additional symbols in normal subframes. As noted above, a configured A-SRS set may include legacy only, additional SRS only, or both.

As illustrated, if a subframe is a UE-specific A-SRS subframe and has additional SRS symbols, as determined at 1202, the UE may rate match PUSCH around the additional symbols (if so determined by the triggered configuration), at 1204. Otherwise, there is no rate matching around additional symbols (per 1206).

Figure 13:
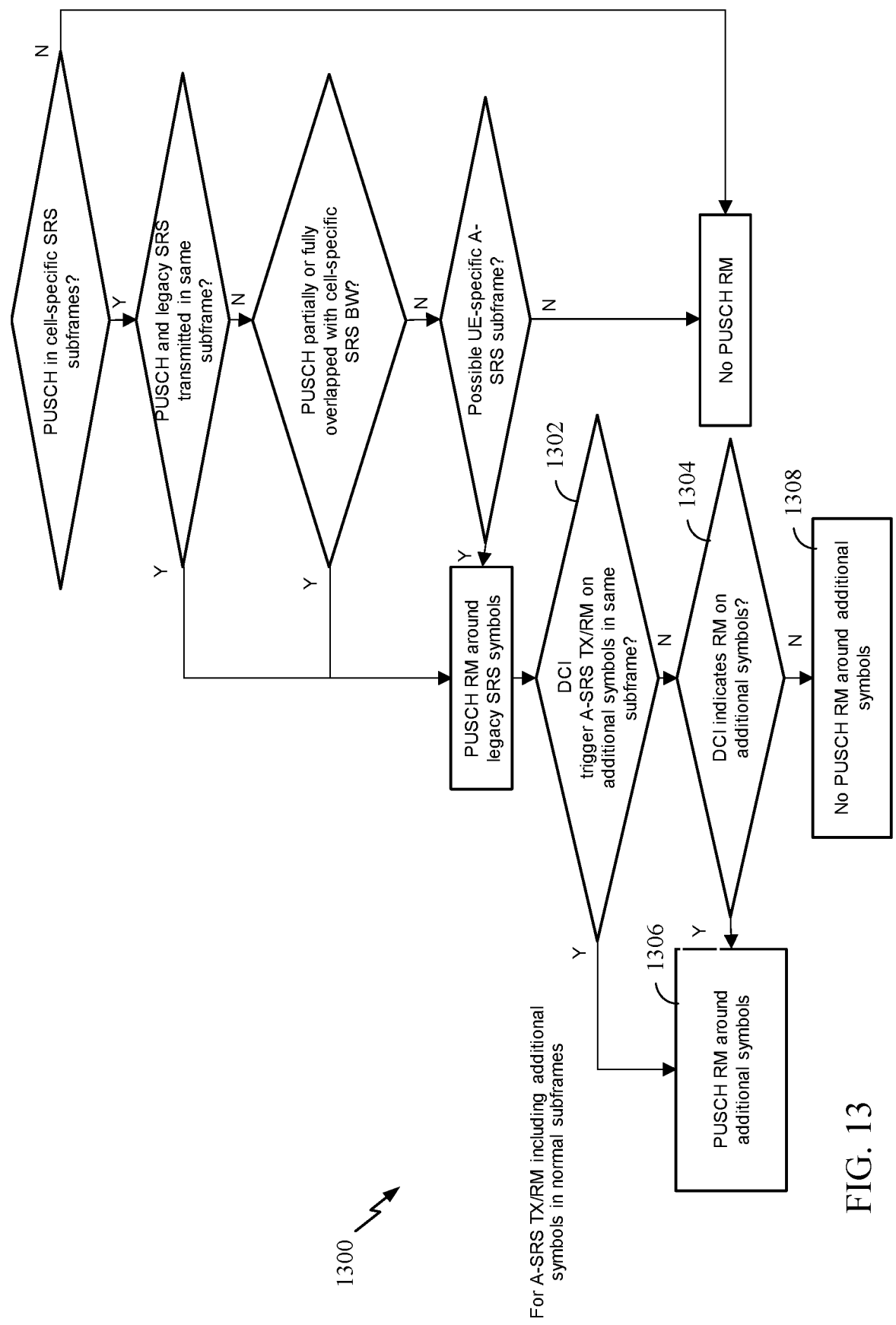

FIG. 13 illustrates example operations 1300 for A-SRS transmission and rate matching according to the second option. As noted above, a configured A-SRS set may include legacy only, additional SRS only, or both. As illustrated, if the DCI triggers a configuration with A-SRS/RM on additional symbols, at 1302, or rate matching on additional symbols, at 1304, the UE may rate match PUSCH around the additional symbols, at 1306. Otherwise, there is no rate matching around additional symbols (per 1308).

Figure 14:
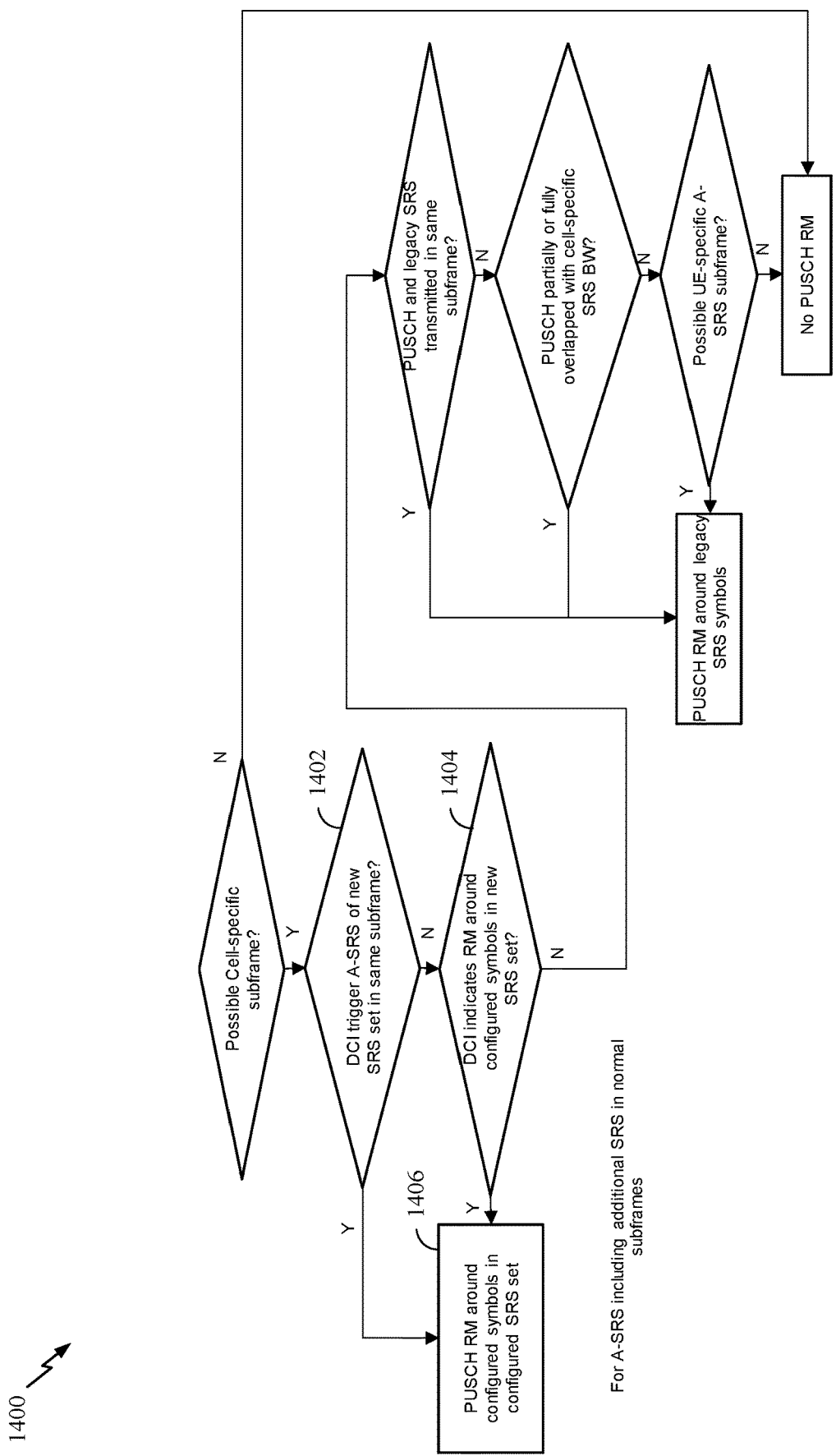

FIG. 14 illustrates example operations 1400 for A-SRS transmission and rate matching according to the third option. As illustrated, operations 1400 may be performed in case of a possible cell-specific subframe. The configured SRS set may include both legacy and additional SRS symbols in a set of one or more cell-specific subframes. As illustrated, if the DCI triggers A-SRS of a new SRS set, as determined at 1402, or indicates rate matching around configured symbols in a new SRS set, as determined at 1404, PUSCH may be rate matched around configured symbols in that set, at 1406.

As illustrated in table 1500 of FIG. 15, new SRS TX/RM set configurations may include a configurable (or pre-defined) number and location SRS symbol(s) for RM and SRS transmission. A particular configuration may be indicated by an SRS request field value. A rate matching configuration (RM config), for example, specifies the number and location of symbols in a normal subframe the UE shall rate match around. For example, the configuration may specify one or more symbols via a bitmap (e.g., 0, 1, . . . , 7). The (symbol) location may be counted from the end of the subframe or from the beginning of subframe. When more than one symbol is configured for RM, the configuration may include possible symbol(s) for guard period and possible symbols for SRS TX in same subframe.

An SRS transmission configuration (SRS TX config) may specify the number and location of symbols in a normal subframe where the UE is to transmit SRS, as well as other SRS configuration information, such as a number of ports (#ports) and periodicity.

As will be described in greater detail with reference to examples shown in FIGS. 17-19, the number and location of symbols for RM and for SRS transmission could be the same or different.

It may be noted that, for the first and second options described herein, the set configuration, by default, may indicate rate matching is to be performed at least around the last symbol of a normal subframe. For option 3, the UE may not need to rate match around the last symbol of a normal subframe (e.g., if not configured in a non-UE-specific A-SRS subframe and SRS is not transmitted on last symbol).

It may be noted that legacy UEs (e.g., UEs that do not support the enhanced A-SRS configurations described herein) are configured to always perform PUSCH rate matching (RM) around a legacy SRS symbol, even if SRS is not transmitted in the configured possible A-SRS subframes. SRS request field values for new (non-legacy) UEs may indicate a rate matching/A-SRS transmission set configuration (e.g., two bits may select one of four different RM/SRS-TX set configurations).

Figure 16:
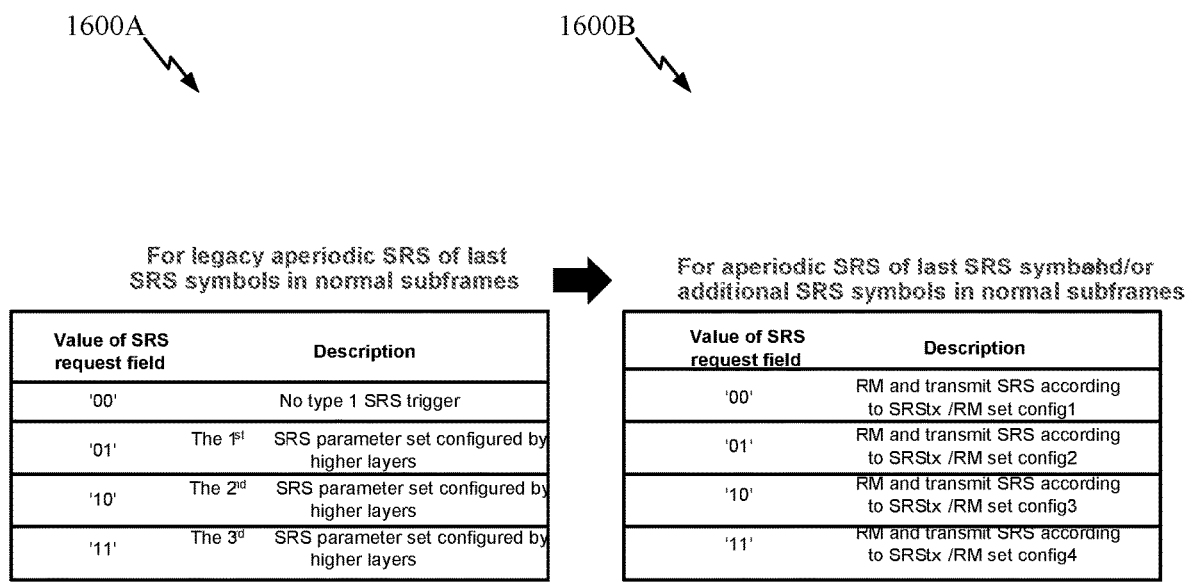

FIG. 16 illustrates an example of how SRS request field bits in a grant (e.g., an uplink grant) may be used to trigger A-SRS, in accordance with aspects of the present disclosure. As illustrated, a UE may be configured (triggered) to transmit Type1 SRS (Aperiodic SRS) per serving cell SRS resources based on a 2-bit SRS request field in an UL grant in DCI (e.g., using DCI Format 4/4A/4B or DCI 0/0A/0B). Legacy UEs, receiving an SRS request field interpreted per table 1600A, may always perform PUSCH rate matching (RM) around legacy SRS symbol even if SRS is not transmitted by the UE in the configured possible A-SRS subframes to protect the other intra-UE's SRS. As illustrated in table 1600B, new UEs may interpret the two bit value of an SRS request field to indicate one of four different rate matching (RM) and SRS transmission configurations.

Figure 17:
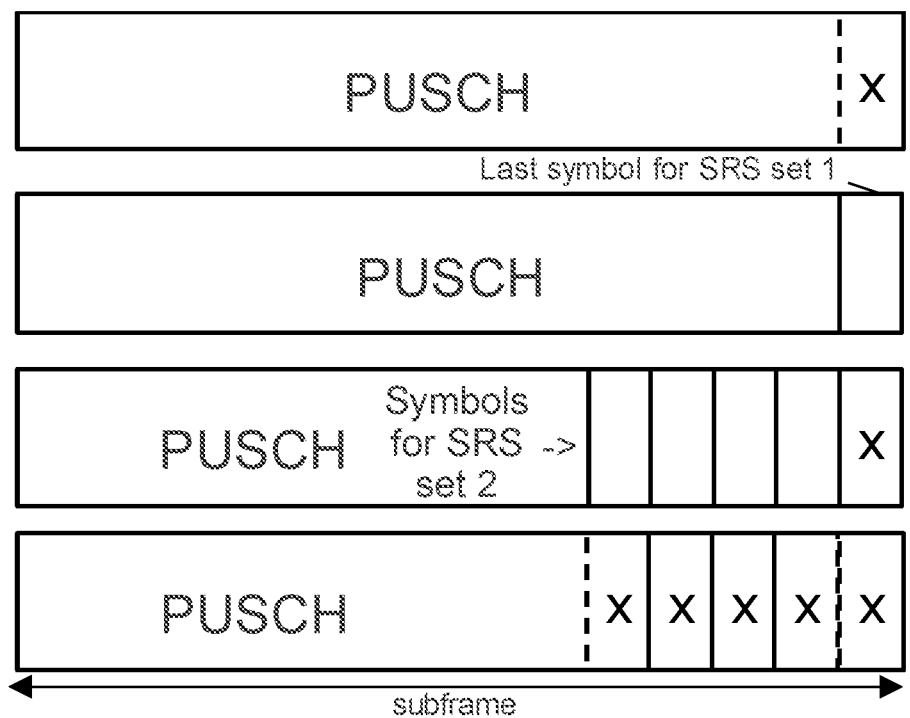

FIG. 17 shows a table 1700A that illustrates an example of how a 2-bit SRS request field of a UL grant may be interpreted to choose one of four different configurations, each with different numbers/locations of symbols for SRS transmission and/or rate matching. If it is used for the second option described above, PUSCH RM may be performed at least around the last symbol of normal subframes in UE-specific A-SRS subframes (even if not configured explicitly). Subframes 1700B graphically illustrate the symbol configurations according to the four options of table 1700A.

Figure 18:
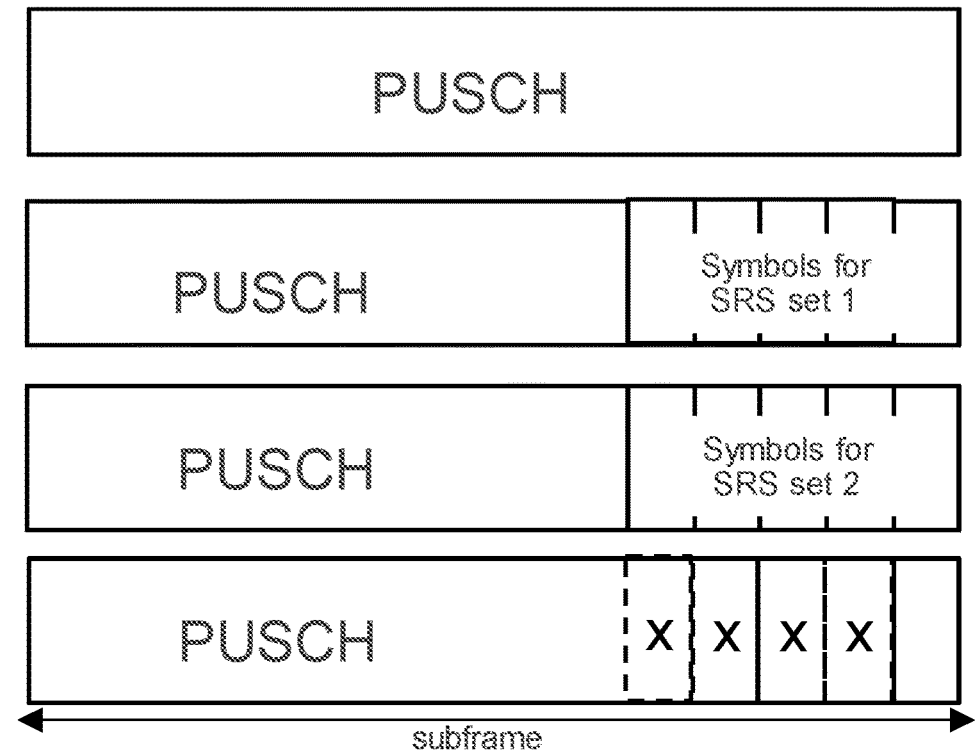

FIG. 18 shows another table 1800A that illustrates another example of how a 2-bit SRS request field of a UL grant may be interpreted to choose different configurations, each with different numbers/locations of symbols for SRS transmission and/or rate matching. The example in FIG. 18 includes a configuration with no symbols for SRS TX or RM ('00'). In other words, if trigger '00' is indicated via the SRS request field of the grant, there is no PUSCH RM in non-UE-specific A-SRS subframes (and the last symbol should be explicitly configured for RM if desired). This interpretation of the SRS request field bits can be used for the third option described herein, where the configuration is not limited to UE-specific A-SRS subframes. Subframes 1800B graphically illustrate the symbol configurations according to the four options of table 1800A.

Figure 19:
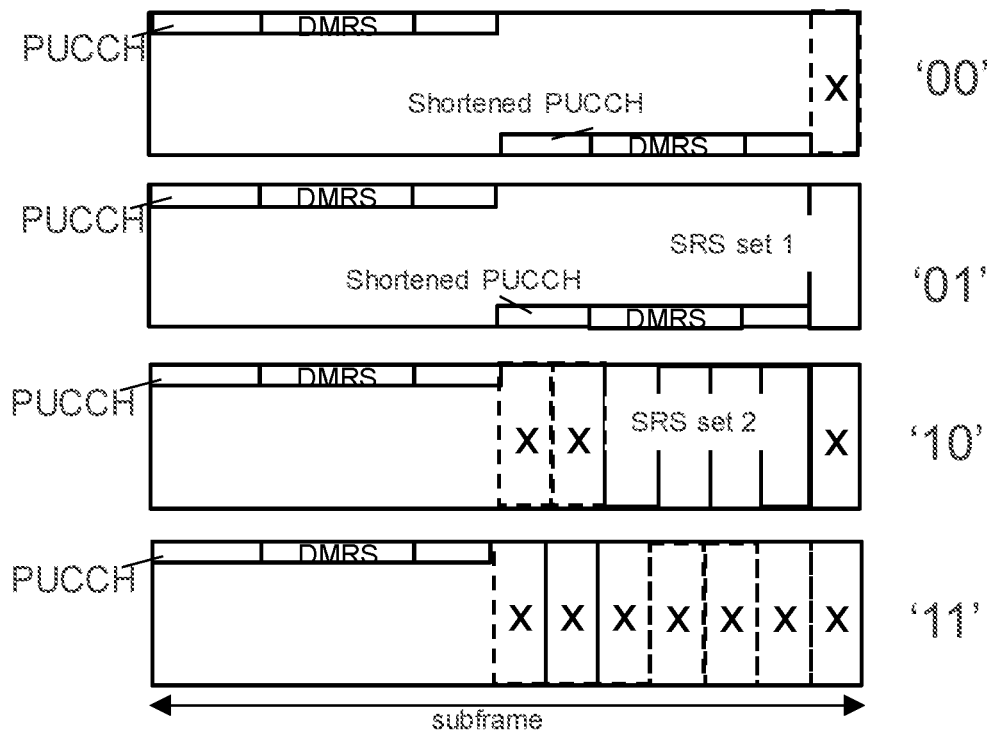

FIG. 19 shows a table 1900A that illustrates another example interpretation for a 2-bit DL SRS request field in a grant to trigger a UE to transmit Type1 SRS (Aperiodic SRS) per serving cell (e.g., via a DL grant in a new DCI format or an existing DCI). For example, the SRS transmission can be triggered even when the UE does not have UL data. For example, if higher layer ackNackSRS-SimultaneousTransmission is configured, a UE supports the transmission of hybrid automatic retransmission request acknowledgment (HARQ-ACK) on PUCCH and SRS in same subframe.

In some cases, shortened PUSCH (sPUSCH) and/or shortened PUCCH (sPUCCH) may be sent in a same subframe as additional SRS symbols. It may be noted that, in this case, PUCCH RM may not be dependent on UE-specific A-SRS subframes, but rate matching may be performed (e.g., using shortened PUCCH) for certain PUCCH formats (e.g., PUCCH formats 1/1a/1b/3) regardless of whether SRS is sent or not. For other PUCCH formats (e.g., PUCCH formats 4/5) depending on whether SRS is sent or not if PUCCH is fully or partially overlapping with cell-specific SRS BW. Therefore, the third option may be used for PUCCH rate matching and/or shortening if SRS is triggered by DCI and ackNackSRS-SimultaneousTransmission is configured. Subframes 1900B graphically illustrate symbol configurations according to the four options of table 1900A, with PUCCH partially overlapping with cell-specific SRS BW.

UEs that do not support shortened PUCCH/PUSCH may rate match or drop in the event the PUCCH/PUSCH overlaps with SRS. In some cases, a UE that does not support sPUSCH/sPUCCH may handle a collision of SRS and PUCCH/PUSCH transmissions by delaying SRS transmission in the additional symbols if the SRS collides with PUCCH/PUSCH/PRACH in the same carrier. In other cases, such a UE may drop SRS transmission in the additional symbols if the SRS collides with PUCCH/PUSCH/PRACH in the same carrier. In still other cases, a UE may be configured to not expect to be triggered with aperiodic SRS in the additional symbols of the SRS that collides PUCCH/PUSCH/PRACH in the same carrier (so it may treat this as an error condition and take some appropriate action).

Figure 20:
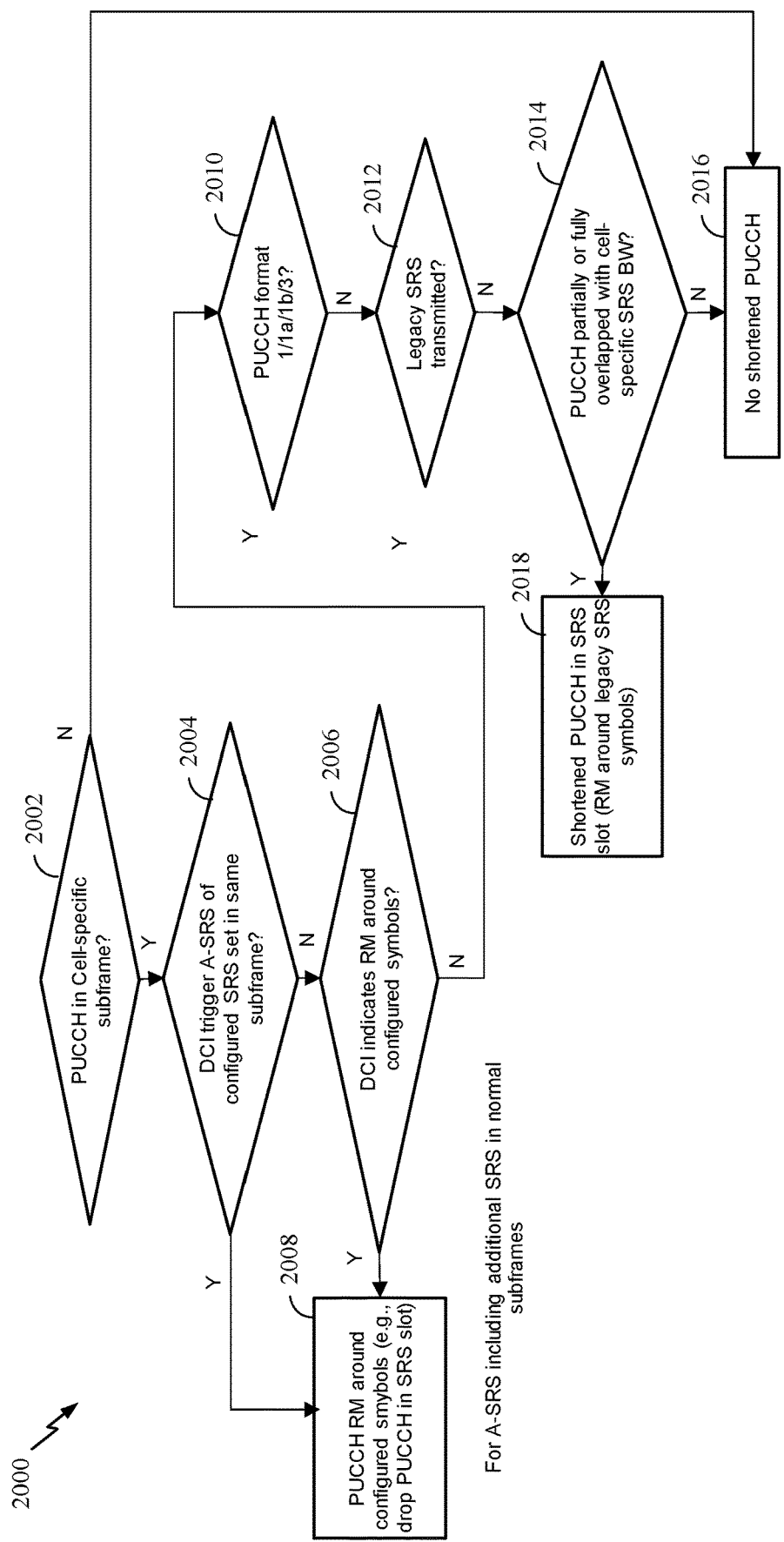
FIG. 20 illustrates an example flow diagram for rate matching an uplink transmission around SRS, in accordance with aspects of the present disclosure.

FIG. 20 illustrates example operations 2000 for processing A-SRS including additional SRS in normal subframes with PUCCH rate matching for the third option presented herein.

A PUCCH is scheduled for a cell-specific subframe, as determined at 2002, If the DCI triggers SRS of configured SRS set in a same subframe, as determined at 2004, or indicates PUCCH rate matching around configured symbols, as determined at 2006, the UE may send a shortened PUCCH with rate matching around the configured symbols or may puncture (drop) the PUCCH transmission in the slot with configured symbols.

If the DCI does not trigger SRS of a configured SRS set in the same subframe and does not indicate rate matching around configured symbols, if a PUCCH is to be transmitted (as determined at 2010) with legacy SRS (as determined at 2012) and the PUCCH at least partially overlaps with cell-specific SRS BW (as determined at 2014), a shortened PUCCH is transmitted in the SRS slot (rate matched around legacy SRS symbols) at 2018. Otherwise, no shortened PUCCH is transmitted (per 2016).

In some cases, when a UE uses PUSCH with rate matching due to additional SRS, the PUSCH performance may be degraded, particularly for piggybacked UCI (e.g., UCI included with the PUSCH data). Aspects of the present disclosure provide various options that may help avoid or mitigate this performance degradation. According to one option, power control parameters (e.g., power control "P_0" of PUSCH) may be modified. For example, power boosting applied on PUSCH rate matching around more than one symbol could improve the PUSCH detection performance.

As another example, how SRS is transmitted may be modified when multiplexing HARQ-ACK information. For example, if a single bit of HARQ-ACK is to be transmitted, a UE may use 2 different sequences for SRS, and pick one depending on the value of the HARQ-ACK bit to be conveyed. Such HARQ-ACK indication outside of PUSCH/PUCCH may not be impacted by PUSCH/PUCCH rate matching.

As another example, if the subframe with important UCI, such as HARQ-Ack, collides with that of SRS transmission with more than one SRS, then a UE may postpone SRS transmission to the next subframe that can be used for SRS. If in that later subframe there is still a collision, then HARQ-ACK may again take precedence and the SRS may be dropped.

Similar mechanisms may be applied when the UE uses a single slot for PUCCH repetition due to the second slot being used for SRS, which may cause the HARQ-ACK performance to be degraded. In other words, the UE may change power control parameters (e.g., "P_0") of PUCCH or may modify the SRS transmission to multiplex HARQ-ACK (e.g., using 2 different sequences for SRS, and pick one depending on a value of a HARQ-ACK bit to convey). Further, if the subframe with UCI, such as HARQ-Ack, collides with that of SRS transmission with more than one SRS, then SRS transmission may be postponed to the next subframe that can be used for SRS. As with the PUSCH example above, if in that later subframe there is still a collision, then HARQ-ACK may take precedence and the SRS may be dropped As previously noted, antenna switching is typically only supported for periodic SRS transmission for legacy UEs. Aspects of the present disclosure, however, provide for the configuring of antenna switching for A-SRS.

As illustrated in FIG. 21, in some cases, RRC signaling may configure different SRS parameter sets for SRS antenna switching, based on UE capability band per band combination. As illustrated, a first SRS parameter set may not allow for antenna switching, but may be fixed on one antenna port AP0 for UEs with only 1 transmit chain (1T) or fixed on two antenna ports (AP0+AP1) for UEs with 2 transmit chains (2T). A second SRS parameter set may allow for antenna switching, for the same UEs.

EXAMPLE EMBODIMENTS

Embodiment 1: A method of wireless communications by a user equipment (UE), comprising receiving signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and sending an uplink transmission, within at least one of the set of uplink subframes, with SRS and rate matching performed according to the A-SRS configuration.

Embodiment 2: The method of Embodiment 1, wherein the set of one or more uplink subframes is semi-statically configured.

Embodiment 3: The method of Embodiment 2, wherein the set of one or more uplink subframes comprises UE-specific A-SRS subframes.

Embodiment 4: The method of any of Embodiments 1-3, wherein a set of one or more bandwidths for SRS transmission is semi-statically configured.

Embodiment 5: The method of Embodiment 4, wherein the set of one or more bandwidths comprises UE-specific A-SRS bandwidths.

Embodiment 6: The method of any of Embodiments 1-5, wherein the second locations comprise at least a last symbol of an uplink subframe of the set.

Embodiment 7: The method of Embodiment 6, wherein the first locations comprise at least one symbol, other than the last symbol, of an uplink subframe.

Embodiment 8: The method of any of Embodiments 1-7, wherein the configuration specifies whether or not to rate match in at least one symbol other than a last symbol.

Embodiment 9: The method of any of Embodiments 1-8, wherein the A-SRS configuration for at least one symbol of an uplink subframe, other than the last symbol, is signaled via downlink control information (DCI).

Embodiment 10: The method of Embodiment 9, wherein the UE is configured with a plurality of possible A-SRS configurations and the DCI indicates one of plurality of possible A-SRS configurations.

Embodiment 11: The method of Embodiment 10, wherein the set of one or more uplink subframes comprise UE-specific A-SRS subframes.

Embodiment 12: The method of Embodiment 11, wherein the indicated A-SRS configuration specifies rate matching on at least a last symbol of an uplink subframe of the set.

Embodiment 13: The method of any of Embodiments 1-12, wherein the indicated A-SRS configuration specifies first locations that comprise at least one symbol, other than a last symbol, of an uplink subframe.

Embodiment 14: The method of any of Embodiments 1-13, wherein the configuration specifies whether or not to perform rate matching in at least one symbol other than the last symbol.

Embodiment 15: The method of any of Embodiments 1-14, wherein the set of one or more uplink subframes comprise cell-specific A-SRS subframes.

Embodiment 16: The method of Embodiment 15, wherein the indicated A-SRS configuration indicates whether or not to rate match on at least the last symbol of an uplink subframe of the set.

Embodiment 17: The method of any of Embodiments 1-16, wherein the indicated A-SRS configuration specifies first locations that comprise at least one symbol, other than the last symbol, of an uplink subframe.

Embodiment 18: The method of any of Embodiments 1-17, wherein the indicated A-SRS configuration specifies whether or not to rate match on at least one symbol other than the last symbol.

Embodiment 19: The method of any of Embodiments 1-18, wherein the uplink transmission conveys at least one bit of uplink control information (UCI).

Embodiment 20: The method of Embodiment 19, wherein one or more power control parameters are modified when sending the uplink transmission to compensate for rate matching around one or more symbols.

Embodiment 21: The method of any of Embodiments 1-20, wherein a first SRS sequence is chosen for an SRS transmission in one or more symbols to convey a first value of the bit of UCI or a second SRS sequence is chosen for an SRS transmission in one or more symbols to convey a second value of the bit of UCI.

Embodiment 22: The method of any of Embodiments 1-21, further comprising determining the subframe with one or more symbols allocated by the A-SRS configuration for SRS transmission collide with the subframe for transmission of the UCI and in response to the determination, postponing SRS transmission until a subsequent subframe available for SRS.

Embodiment 23: The method of Embodiment 22, further comprising determining, in the subsequent subframe with one or more symbols allocated by the A-SRS configuration for SRS transmission again overlap with the subframe for transmission of UCI and in response to the determination, dropping the SRS transmission in that subframe.

Embodiment 24: The method of any of Embodiments 1-23, further comprising receiving signaling indicating information for antenna switching for the A-SRS configuration.

Embodiment 25: The method of Embodiment 24, further comprising providing signaling indicating capability of the UE for aperiodic SRS antenna switching for one or more band combinations, wherein the information for antenna switching for the A-SRS configuration is determined based on the indicated capability.

Embodiment 26: A method of wireless communications by a network entity, comprising transmitting, to a user equipment (UE), signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and processing an uplink transmission from the UE, within at least one of the set of uplink subframes, in accordance with the A-SRS configuration.

Embodiment 27: The method of Embodiment 26, wherein the set of one or more uplink subframes is semi-statically configured.

Embodiment 28: The method of Embodiment 27, wherein the set of one or more uplink subframes comprise UE-specific A-SRS subframes.

Embodiment 29: The method of any of Embodiments 26-28, wherein a set of one or more bandwidths for SRS transmission is semi-statically configured.

Embodiment 30: The method of Embodiment 29, wherein the set of one or more bandwidths comprises UE-specific A-SRS bandwidths.

Embodiment 31: The method of any of Embodiments 26-30, wherein the second locations comprise at least the last symbol of an uplink subframe of the set.

Embodiment 32: The method of Embodiment 31, wherein the first locations comprise at least one symbol, other than the last symbol, of an uplink subframe allocated for SRS transmission.

Embodiment 33: The method of any of Embodiments 26-32, wherein the configuration specifies whether or not to rate match in at least one symbol other than the last symbol.

Embodiment 34: The method of any of Embodiments 26-33, wherein the A-SRS configuration for at least one symbol of an uplink subframe, other than the last symbol, is signaled via downlink control information (DCI).

Embodiment 35: The method of Embodiment 34, wherein the UE is configured with a plurality of possible A-SRS configurations and the DCI indicates one of plurality of possible A-SRS configurations.

Embodiment 36: The method of Embodiment 35, wherein the set of one or more uplink subframes comprise UE-specific A-SRS subframes.

Embodiment 37: The method of Embodiment 36, wherein the indicated A-SRS configuration specifies second locations that comprise at least the last symbol of an uplink subframe of the set.

Embodiment 38: The method of any of Embodiments 26-37, wherein the indicated A-SRS configuration specifies first locations that comprise at least one symbol, other than the last symbol, of an uplink subframe.

Embodiment 39: The method of any of Embodiments 26-38, wherein the configuration specifies whether or not to perform rate matching in at least one symbol other than the last symbol.

Embodiment 40: The method of any of Embodiments 26-39, wherein the set of one or more uplink subframes comprise cell-specific A-SRS subframes.

Embodiment 41: The method of Embodiment 40, wherein the indicated A-SRS configuration indicates whether or not to rate match on at least the last symbol of an uplink subframe of the set.

Embodiment 42: The method of any of Embodiments 26-41, wherein the indicated A-SRS configuration specifies second locations that comprise at least one symbol, other than the last symbol, of an uplink subframe.

Embodiment 43: The method of any of Embodiments 26-42, wherein the indicated A-SRS configuration specifies whether or not to rate match on at least one symbol other than the last symbol.

Embodiment 44: The method of any of Embodiments 26-43, wherein the uplink transmission conveys at least one bit of uplink control information (UCI).

Embodiment 45: The method of Embodiment 44, wherein a first SRS sequence is chosen for an SRS transmission in one or more symbols to convey a first value of the bit of UCI or a second SRS sequence is chosen for an SRS transmission in one or more symbols to convey a second value of the bit of UCI.

Embodiment 46: The method of any of Embodiments 26-45, further comprising transmitting signaling indicating information for antenna switching for the A-SRS configuration.

Embodiment 47: The method of Embodiment 46, further comprising receiving signaling indicating capability of the UE for aperiodic SRS antenna switching for one or more band combinations, wherein the information for antenna switching for the A-SRS configuration is determined based on the indicated capability.

Embodiment 48: An apparatus for wireless communications by a user equipment (UE), comprising means for receiving, from the network, signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and means for sending an uplink transmission, within at least one of the set of uplink subframes, with SRS and rate matching performed according to the A-SRS configuration.

Embodiment 49: An apparatus for wireless communications by a network entity, comprising means for transmitting, to a user equipment (UE), signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and means for processing an uplink transmission from the UE, within at least one of the set of uplink subframes, in accordance with the A-SRS configuration.

Embodiment 50: An apparatus for wireless communications by a user equipment (UE), comprising a receiver configured to receive, from the network, signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and a transmitter configured to send an uplink transmission, within at least one of the set of uplink subframes, with SRS and rate matching performed according to the A-SRS configuration.

Embodiment 51: An apparatus for wireless communications by a network entity, comprising a transmitter configured to transmit, to a user equipment (UE), signaling indicating an aperiodic sounding reference signal (A-SRS) configuration that indicates, for a set of one or more uplink subframes, a first number and first locations of zero or more symbols allocated for SRS transmissions and a second number and second locations of zero or more symbols for which rate matching is to be performed and at least one processor configured to process an uplink transmission from the UE, within at least one of the set of uplink subframes, in accordance with the A-SRS configuration.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 9 and 10 may be performed by various processors shown in FIG. 4. More particularly, operations 900 of FIG. 9 may be performed by processors 420, 460, 438, and/or controller/processor 440 of the BS 110 shown in FIG. 4 while operations 1000 of FIG. 10 may be performed by one or more of processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:

receiving a first set of configuration for an aperiodic sounding reference signal (A-SRS), the first set of configuration comprising a first number and a first location of symbol or symbols for the A-SRS, and a second set of configuration for the A-SRS, the second set of configuration comprising a second number and a second location of symbol or symbols for the A-SRS;

receiving downlink control information (DCI), the DCI comprising a field triggering the A-SRA and indicating resources for the A-SRS, the field comprising a first value not triggering the A-SRS, a second value triggering the A-SRS based on the first set of configuration, or a third value triggering the ASRS based on the second set of configuration; and sending the A-SRS based on the DCI.

2. The method of claim 1, the first set of configuration and the second set of configuration having a granularity of a slot.

3. A method of wireless communications by a network entity, comprising:

transmitting, to a user equipment (UE), a first set of configuration for an aperiodic sounding reference signal (A-SRS), the first set of configuration comprising a first number and a first location of symbol or symbols for the A-SRS, and a second set of configuration for the A-SRS, the second set of configuration comprising a second number and a second location of symbol or symbols for the A-SRS;

transmitting, to the UE, downlink control information (DCI), the DCI comprising a field triggering the A-SRA and indicating resources for the A-SRS, the field comprising a first value not triggering the A-SRS, second value triggering the A-SRS SRS of based on the first set of configuration, or a third value triggering the A-SRA based the second set of configuration; and receiving the A-SRS based on the DCI.

4. The method of claim 3, the first set of configuration and the second set of configuration having a granularity of a slot.

5. An apparatus for wireless communications, comprising:

a transceiver and a processor, the processor comprising a combination of computing devices, the transceiver and the processor being configured to:

receive a first set of configuration for an aperiodic sounding reference signal (A-SRS), the first set of configuration comprising a first number and a first location of symbol or symbols for the A-SRS, and a second set of configuration for the A-SRS, the second set of configuration comprising a second number and a second location of symbol or symbols for the A-SRS;

receive downlink control information (DCI), the DCI comprising a field triggering the A-SRA and indicating resources for the A-SRS, the field comprising a first value not triggering the A-SRS, a second value triggering the A-SRS based on the first set of configuration, or a third value triggering the A-SRS based on the second set of configuration; and a transmitter hardware configured to send the A-SRS based on the DCI.

6. An apparatus for wireless communications, comprising:

a transceiver and a processor, the processor comprising a combination of computing devices, the transceiver and the processor being configured to:

transmit, to a user equipment (UE), a first set of configuration for an aperiodic sounding reference signal (A-SRS), the first set of configuration comprising a first number and a first location of symbol or symbols for the A-SRS, and a second set of configuration for the A-SRS, the second set of configuration comprising a second number and a second location of symbol or symbols for the A-SRS;

transmit, to the UE, downlink control information (DCI), the DCI comprising a field triggering the A-SRA and indicating resources for the A-SRS, the field comprising a first value not triggering the A-SRS, a second value triggering the A-SRS based on the first set of configuration, or a third value triggering the A-SRA based on the second set of configuration; and a receiver hardware configured to receive the A-SRS based on the DCI.

* * * * *